US009752635B2

(12) United States Patent
Bahmata et al.

(10) Patent No.: US 9,752,635 B2
(45) Date of Patent: Sep. 5, 2017

(54) CLUTCH FOR A PARKING BRAKE SYSTEM

(71) Applicant: AKEBONO BRAKE INDUSTRY CO., LTD, Chuo-ku, Tokyo (JP)

(72) Inventors: Aurelian Bahmata, South Lyon, MI (US); Galus Chelaidite, South Lyon, MI (US)

(73) Assignee: AKEBONO BRAKE INDUSTRY CO., LTD., Tokyo (JP)

(*) Notice: Subject to any disclaimer, the term of this patent is extended or adjusted under 35 U.S.C. 154(b) by 42 days.

(21) Appl. No.: 14/833,383

(22) Filed: Aug. 24, 2015

(65) Prior Publication Data

US 2017/0058979 A1    Mar. 2, 2017

(51) Int. Cl.
| F16D 65/18 | (2006.01) |
| F16D 55/225 | (2006.01) |
| F16D 121/24 | (2012.01) |
| F16D 125/40 | (2012.01) |

(52) U.S. Cl.
CPC .......... F16D 65/18 (2013.01); F16D 55/225 (2013.01); *F16D 2121/24* (2013.01); *F16D 2125/40* (2013.01)

(58) Field of Classification Search
CPC .... F16D 65/18; F16D 55/225; F16D 2121/24; F16D 2125/40
See application file for complete search history.

(56) References Cited

U.S. PATENT DOCUMENTS

| 5,090,518 | A * | 2/1992 | Schenk | B60T 8/00 188/157 |
| 7,806,241 | B2 * | 10/2010 | Takahashi | B60T 13/746 188/157 |
| 8,220,593 | B2 * | 7/2012 | Baumgartner | F16D 65/092 188/162 |
| 2008/0011560 | A1 * | 1/2008 | Yamaguchi | B60T 13/741 188/158 |
| 2008/0099287 | A1 * | 5/2008 | Severinsson | F16D 65/18 188/72.2 |
| 2008/0156593 | A1 * | 7/2008 | Severinsson | F16D 65/092 188/71.9 |
| 2008/0210498 | A1 * | 9/2008 | Baumgartner | F16D 65/092 188/72.2 |

(Continued)

FOREIGN PATENT DOCUMENTS

WO    2015/151052 A1    10/2015

*Primary Examiner* — Vishal Sahni
(74) *Attorney, Agent, or Firm* — The Dobrusin Law Firm, P.C.

(57) ABSTRACT

A brake system is disclosed, which comprises a parking brake system and an inboard brake pad. The parking brake system includes a first actuator assembly, a second actuator assembly, a motor, and a clutch. The clutch selectively communicates power from the motor to the first actuator assembly so that a first end of the inboard brake pad is moved relative to a brake rotor. The clutch selectively communicates the power from the motor to the second actuator assembly so that a second end of the inboard brake pad is moved relative to the brake rotor. The clutch selectively communicates the power from the motor to both the first actuator assembly and the second actuator assembly so that both the first and the second ends of the inboard brake pad are moved relative to the brake rotor.

20 Claims, 3 Drawing Sheets

(56) References Cited

U.S. PATENT DOCUMENTS

| | | | | |
|---|---|---|---|---|
| 2011/0100768 A1* | 5/2011 | Baumgartner | ........ | B60T 13/741 188/72.2 |
| 2014/0182980 A1* | 7/2014 | Muramatsu | ........... | B60T 13/741 188/156 |
| 2015/0129371 A1* | 5/2015 | Gutelius | ................ | F16D 65/18 188/72.6 |
| 2015/0362031 A1 | 12/2015 | Kong et al. | | |

* cited by examiner

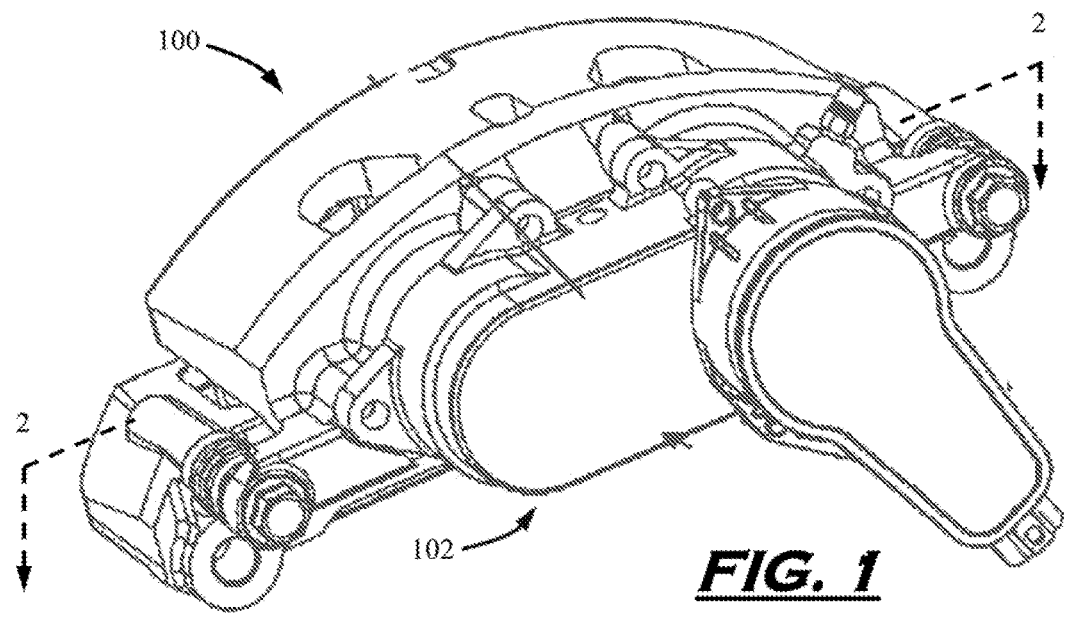
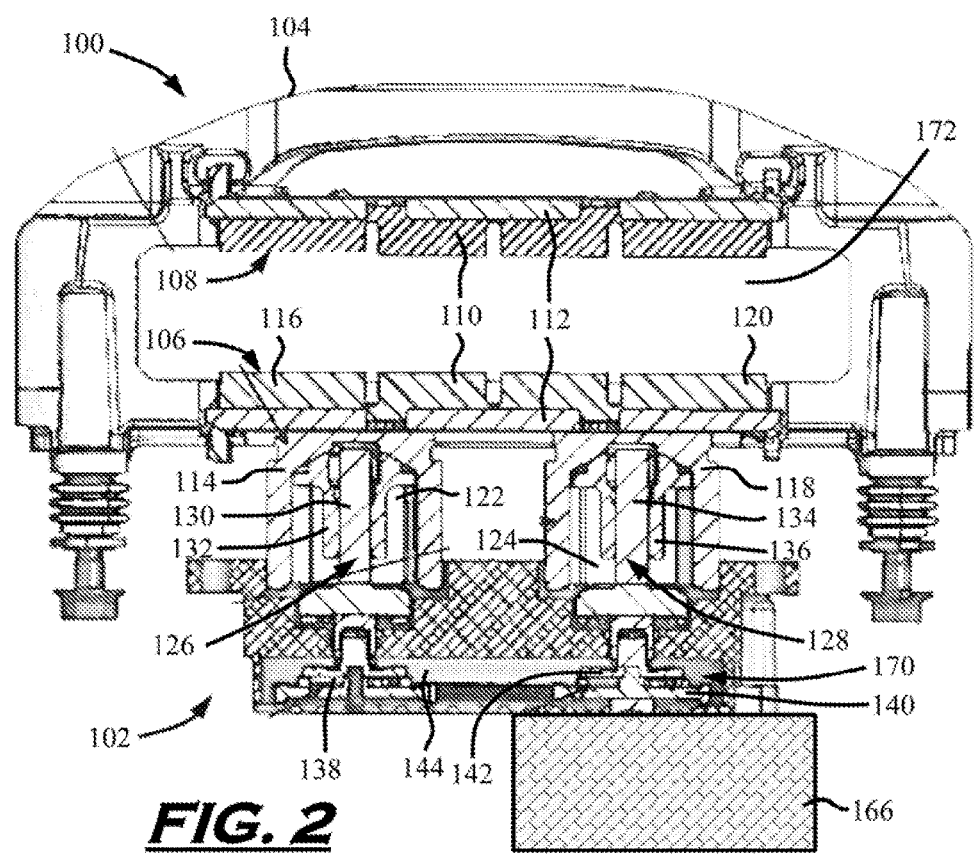

CLUTCH FOR A PARKING BRAKE SYSTEM

FIELD

The present teachings relate to a brake system, and more particularly to a clutch for a parking brake system.

BACKGROUND

Some vehicles, including passenger ears and trucks, use single-piston hydraulic brake systems for vehicle deceleration. Some vehicles use electromechanical parking brake systems that utilize the same single-piston brake systems to maintain the vehicle in a stopped or parked position. These electromechanical parking brake systems typically have a motor gear unit that generates a sufficient torque to move the single piston and, therefore, one or more brake pads against a brake rotor to create a clamping force to maintain the vehicle in a stopped or parked position.

Other vehicles, like full-size trucks, vans, and SUVs, use multi-piston hydraulic brake systems for vehicle deceleration, and separate parking brake systems for maintaining the vehicle in a stopped or parked position.

To improve parking brake performance, while also reducing weight, costs, and packaging space, in some vehicle platforms, it may be desirable to have, parking brake systems that utilize the existing multi-piston brake systems. It may be desirable to have a parking brake system that utilizes an existing multi-piston brake system without requiring a super high output motor to move the pistons and the brake pads against a brake rotor to create the clamping force. For example, it may be attractive to have a parking brake system for a heavy-duty vehicle platform having multi-piston brake systems that can use a motor from a light-duty vehicle platform to sufficiently move the pistons and brake pads against the brake rotor to create a sufficient clamping force to maintain the vehicle in a stopped or parked position.

SUMMARY

The teachings herein provide an improved brake system, parking brake system, or both. More specifically, the present teachings provide improved components for a parking brake system. These teachings provide a parking brake system that may utilize an existing multi-piston hydraulic brake system without requiring super high output motors to move the pistons and the brake pads against a brake rotor to create the clamping force. The teachings herein provide a parking brake system for a heavy-duty vehicle platform having multi-piston brake systems that can use a motor from a light-duty vehicle platform to sufficiently move the pistons and brake pads against the brake rotor to create a sufficient clamping force to maintain the vehicle in a stopped or parked position.

These teachings further provide a brake system comprising a parking brake system and an inboard brake pad. The parking brake system includes a first actuator assembly, a second actuator assembly, a motor, and a clutch. The clutch selectively communicates power from the motor to the first actuator assembly so that a first end of the inboard brake pad is moved relative to a brake rotor. The clutch selectively communicates the power from the motor to the second actuator assembly so that a second end of the inboard brake pad is moved relative to the brake rotor. The clutch selectively communicates the power from the motor to both the first actuator assembly and the second actuator assembly so that both the first and the second ends of the inboard brake pad are moved relative to the brake rotor.

Further yet, these teachings provide an assembly comprising a brake caliper and a parking brake system. The brake caliper includes a brake pad. The parking brake system includes a first actuator assembly in communication with a first end of the brake pad. The parking brake system includes a second actuator assembly in communication with a second end of the brake pad. The parking brake system includes a motor gear unit that is in selective communication with the first actuator assembly, the second actuator assembly, or both, and an electromechanical clutch comprising a coupler and a solenoid. During use, electrical power is modulated to the solenoid so that the coupler moves in a first direction and engages a second gear so that power from the motor gear unit is communicated to the first actuator assembly so that the first end of the brake pad is moved relative to a brake rotor. During use, electrical power is modulated to the solenoid so that the coupler moves in a second direction and engages a third gear so that the power from the motor gear unit is communicated to the second actuator assembly so that the second end of the brake pad is moved relative to the brake rotor.

Still further yet, these teachings provide a method. A method comprises providing the brake system according to the teachings herein. The method includes a step of communicating the power from the motor to the first actuator assembly, the second actuator assembly, or both so that the first end of the brake pad, the second end of the brake pad, or both is moved towards the brake rotor to create a parking brake apply. The method also includes a step of communicating the power from the motor to the first actuator assembly, the second actuator assembly, or both so that the first end of the brake pad, the second end of the brake pad, or both is moved away from the brake rotor to release a parking brake apply.

BRIEF DESCRIPTION OF THE DRAWINGS

FIG. 1 is a perspective view of a brake system and a parking brake system according to the teachings herein.

FIG. 2 is a cross-sectional view of the brake system and the parking brake system of FIG. 1 taken along line 2-2.

DETAILED DESCRIPTION

Figure 3:
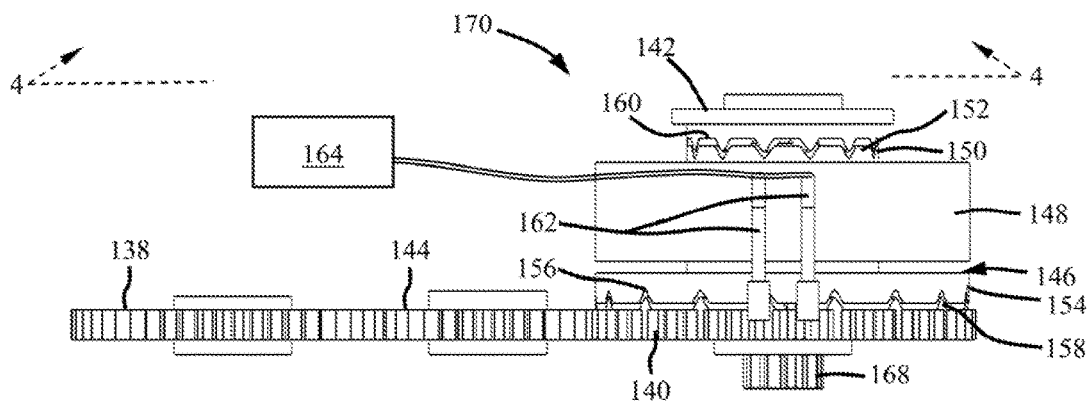
FIG. 3 is a detailed side view of a portion of the parking brake system.

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes, Other combinations are also possible as will be gleaned from the following claims, which are also hereby incorporated by reference into this written description.

The present teachings are predicated upon providing an improved brake system, an improved parking brake system, or both. More particularly, the description herein relates to improved components for a brake system, a parking brake system, or both. The present teachings may be used with a brake system and/or a parking brake system in any vehicle. For example, the teachings herein can be used in any size car, truck, bus, train, airplane, all terrain vehicle, etc. The present teachings may also be used in non-vehicular applications. For example, the teachings herein may be applied to brake systems used in various machines, such as a lathe, a winder for paper products or cloth, amusement park rides, wind turbines, or the like.

The brake system can be any device, system, and/or assembly used to create a clamping force. The clamping force may be any force that slows and/or prevents movement or rotation of a brake rotor; decelerates and/or prevents movement of a vehicle; or both. The clamping force may be created by converting kinetic energy of a vehicle into thermal energy. The clamping force can be created during a standard brake apply, a parking brake apply, or both. A standard brake apply may function to slow and/or stop a vehicle. A parking brake apply may function to park or prevent movement of a stopped or parked vehicle. Exemplary brake systems include opposing brake systems (i.e., a fixed caliper brake systems) and floating brake systems (i.e., a floating calipers). The brake system may generally include a brake rotor, one or more brake pads, and a brake caliper supporting one or more brake pistons.

A parking brake system may be added to or integrated with the brake system. The parking brake system may function to create a clamping force to maintain a vehicle in a stopped or parked position. The parking brake system may use one or more components of the brake system to create the clamping force. For example, the parking brake system may move the one or more brake pistons and the brake pads against the brake rotor to create the clamping force. The parking brake system may move the one or more pistons and therefore the brake pads away from the rotor to release the clamping force. The parking brake system may generally include a motor gear unit, one or more gears, one or more actuator assemblies, and a clutch.

The brake rotor may cooperate with the components of the brake system, the parking brake system, or both to create the clamping force required to maintain a vehicle in a stopped or parked position. When the vehicle is in motion (i.e., when there is no clamping force), the brake rotor may rotate with the wheel and axle of a vehicle. The brake rotor may include an inboard side and an opposing outboard side. One or more brake pads may face the inboard side of the brake rotor, and one or more brake pads may face the outboard side of the brake rotor. TO create the clamping force during a parking brake apply, the friction material of the one or more brake pads may be moved against at least one of the sides of the brake rotor. After the one or more brake pads are moved against the brake rotor (i.e., once the clamping force is created), the brake rotor may be restricted from rotating, and, accordingly, the vehicle may be parked and restricted from moving. After the friction material of the one or more brake pads is moved away from the brake rotor and the clamping force is released, the brake rotor can once again rotate, and, accordingly, the vehicle may move.

The one or more brake pads may be moved against the brake rotor to create the clamping force during parking brake apply. The one or more brake pads may be moved away from the brake rotor to release the clamping force during release of the parking brake. The one or more brake pads may include one or more ears or projections. The one or more ears or projections may engage a brake caliper, a support bracket, or both.

The one or more brake pads may be supported on the brake caliper so that the friction material of the brake pads faces a corresponding side of the brake rotor. The friction material may be pressed against a side of the break rotor to create the clamping force required to decelerate a vehicle, park a vehicle, or both. The one or more brake pads may comprise at inboard brake pad with an inboard frictional material facing the inboard side of the brake rotor, and an outboard brake pad having an outboard friction material facing the outboard side of the brake rotor. The friction material may include one or more materials that are non-metallic, semi-metallic, fully metallic, and/or ceramic. The friction material may be slotted and/or may include grooves. The pressure plate may oppose the friction material. The one or more brake pistons and the one or more brake caliper fingers may be in selective contact with the pressure plate of a corresponding brake pad. For example, one or more brake pistons may be in selective contact with a pressure plate of the inboard brake pad located, and one or more brake caliper fingers may be in contact with the pressure plate of the outboard brake pad. During a parking brake apply, the one or more brake pistons and/or the one or more brake caliper fingers can be moved against a corresponding pressure plate so that all or an end of a corresponding brake pad is moved against the brake rotor to create the clamping force. During release of the parking brake, the one or more brake pistons and/or the one or more brake caliper fingers can be moved away from the corresponding pressure plate so that at all or an end of a corresponding brake pad moves away from the brake rotor to release the clamping force.

The one or more brake pads may include a first end and a second end. The first end may be a leading end and the second end may be a trailing end, or vice versa. Over time, the first or leading end may wear more, or wear faster than the second or trailing end. This may be known in the art as taper wear. Stated another way, the first or leading end may contact the brake rotor first and/or with a greater force than the second or trailing end. This may cause the first or leading end to wear more, or wear faster, than the second or trailing end. Accordingly, over time, the first or leading end may need to be moved a greater distance than the second or trailing end to engage the brake rotor and create a sufficient clamping force to park a vehicle.

The brake caliper may function to support one or more components of the brake system, the parking brake system, or both. The brake caliper may provide for the movement of one or more brake pads, or, preferably, two or more brake pads relative to the brake rotor. The brake caliper may provide for the movement of one or more brake pistons, or, preferably, two or more brake pistons relative to the brake pads and brake rotor. The brake caliper may include one or more supports configured to engage and/or support the one or more brake pads. The brake caliper may move during a brake apply (i.e., a floating caliper), or the brake caliper may be fixed so that the brake caliper does not move during a brake apply (i.e., a fixed caliper). The brake caliper may be connected to a knuckle or a support structure of a vehicle.

The brake caliper may include one or more caliper bores. The one or more caliper bores may be one or more hollow regions in the brake caliper configured to support a brake piston. The one or more caliper bores may be any shape. Preferably, the shape of the one or more caliper bores corresponds to the shape of a corresponding brake piston. Preferably, the one or more caliper bores are cylindrically-shaped.

The brake caliper may include one or more piston boots. The one or more piston boots may function to prevent fluid from leaking out of or from the one or more caliper bores. The one or more piston boots may prevent dust and other debris from entering the one or more caliper bores and/or contaminating the fluid contained therein. The one or more piston boots may be attached to the brake caliper in the area of the caliper bores; to an outer surface of a corresponding brake piston; or both. The one or more piston boots may support a corresponding brake piston. The one or more piston boots may be fabricated from any suitable material. Preferably, the one or more piston boots are fabricated from a flexible material so that the piston boots can move, flex, bond, and/or deform, without tearing or otherwise becoming damaged, when a corresponding brake piston is moved. The one or more piston boots may prevent a corresponding brake piston from rotating. By preventing the brake piston from rotating within the piston boot, damage to the piston boot can be prevented.

The brake caliper may support one or more brake pistons. During a parking brake apply, one or more brake pistons may be moved so that a corresponding brake pad, or, preferably, a corresponding, end of a brake pad moves. For example, a brake piston positioned near a first or leading end of the brake pad may be moved so that a first or leading end of the brake pad moves towards the brake rotor. A brake piston positioned near a second or trailing end of a brake pad may be moved so that a second or trailing end of the brake pad moves towards the brake rotor. Moreover, during release of the parking brake, movement of a brake piston located near a first or leading end of the brake pad may cause the first or leading end to move away from the brake rotor to release the clamping force. Movement of a brake piston positioned near a second or trailing end of the brake pad may cause the second or trailing end to move away from the brake rotor to release the clamping force.

During a parking brake apply, the brake pistons can be moved simultaneously, sequentially, or a combination of both. Similarly, during release of the parking brake, the brake pistons can be moved simultaneously, sequentially, or a combination of both. For example, the first brake piston and thus a first or leading end of the brake pad can be moved towards the brake rotor before the second piston and thus the second or leading end of the brake pad, or vice versa. The same may occur during release of the parking brake. In some configurations, however, all of the brake pistons can be moved simultaneously so that the entire friction material or surface contact the brake rotor at substantially the same time to create the clamping force. All of the brake pistons can also be moved simultaneously away from the brake pads during release of the parking brake.

The one or more brake pistons may include an outer brake piston surface. The outer brake piston surface may be in sliding contact or communication with a corresponding caliper bore, piston boot, or both. The one or more brake pistons may include an outer end surface. During a parking brake apply, the outer end surface can be selectively engaged against the pressure plate of a brake pad (i.e., an inboard brake pad) so that the brake pad can be moved towards and against the brake rotor to create the clamping force. During release of the parking brake, the outer end surface can be selectively moved away from the pressure plate of a brake pad (i.e., an inboard brake pad) so that the brake pad can move away from the brake rotor to release the clamping force A first or leading brake piston may be located at or near a first or leading end of the inboard brake pad, and a second or trailing brake piston may be located at or near a second or trailing end of the inboard brake pad, or vice versa. The one or more brake pistons may include any suitable number of pistons. For example, the one or more brake pistons may preferably include two or more brake pistons, however, three or more, four or more, or even five or more brake pistons may be within the scope of this disclosure. The number of brake pistons may vary depending on the application for which the brake system, the parking brake system, or both is to be used. For example, heavy duty and/or cargo transportation systems or vehicles may require two or more brake pistons to create a sufficient clamping force, while one or more brake pistons may be suitable for creating a clamping force in light duty systems or vehicles.

One or more of the brake pistons may include a piston pocket. The one or more piston pockets may function to receive fluid, an actuator assembly, or both. During a standard brake apply, the fluid may be pressurized so that the brake piston moves towards the brake pad and then moves the brake pad against the brake rotor to create the clamping force. During release of a standard brake apply, the fluid may be de-pressurized so that the brake piston moves away from the brake pad and the brake pad can move away from the brake rotor to releasing the clamping force. During a parking brake apply, the actuator assembly may be moved in an apply direction so that the brake piston moves towards the brake pad and then moves the brake pad against the brake rotor to create the clamping force. During release of the parking brake, the actuator assembly may be moved in a release direction so that the brake piston moves away from the brake pad and thus the brake pad can move away from the brake rotor to release the clamping force.

The piston pocket may be a cup or recess formed into an end of the brake piston. Preferably, the piston pocket is formed into an open end of the brake piston and extends into the brake piston towards a bottom pocket surface. Alternatively, the piston pocket may be a core or channel extending through both ends of a brake piston. Preferably, the piston pocket is a generally open space defined between the outer brake piston surface, the outer end surface, and an open end. The piston pocket may function to receive and/or engage at least part of a corresponding actuator assembly, which may include a spindle and a nut. The nut may engage the piston pocket such that the nut does not rotate relative to the brake piston.

The one or more actuator assemblies may function to move the one or more brake pistons and/or brake pads towards and/or away from the brake rotor to create and/or release the parking brake apply, respectively. The one or more actuator assemblies may function to transfer torque from the motor gear unit to move the corresponding brake pistons towards and/or away from the one or more inboard brake pads. Preferably, each brake piston is dedicated to a corresponding actuator assembly. For example, the one or more actuator assemblies may include a first actuator assembly for moving a first brake piston, and a second actuator assembly for moving a second brake piston, or vice versa. The first actuator assembly may be located near a first or leading end of a brake pad, and the second actuator assembly may be located near a second or trailing end of a brake pad, or vice versa. Each of the one or more actuator assemblies may include a spindle and a nut.

The one or more spindles may function to transfer torque from the motor gear to a nut so that the corresponding nut, brake piston, and/or brake pad move towards, and eventually against, the brake rotor to create the clamping force. The one or more spindles may function to transfer a torque from the motor gear unit to a nut so that the corresponding nut, brake piston, and/or brake pad moves away from the brake rotor to release the clamping force. Each of the one or more spindles may have an input portion that is in communication with the motor gear, and an output portion that is in communication with a corresponding nut. The input portion may receive torque from the motor gear, or from a component or gear in communication with the motor gear unit. Preferably, the input portion receives torque from one or more gears in communication with the motor gear unit. The input portion may include any suitable connection for connecting with the motor gear unit or gear in communication with the motor gear unit. Preferably, the engagement is a keyed or splined engagement; however, a notched, friction, or similar engagement may be used. The output portion of the spindle may be in communication with a corresponding nut. The output portion may include any suitable connection for connecting with the nut. Preferably, the connection is threaded; however, other like, suitable connections may be used. Preferably, the output portion is a male threaded portion, and the nut includes a female threaded portion.

The one or more nuts may cooperate with a corresponding spindle to move a corresponding brake piston. That is, each of the one or more nuts may be in communication with a corresponding brake piston, and may function to transfer torque received from a corresponding spindle, motor gear unit, or both to move the brake piston. That is, rotation of a spindle may cause the corresponding nut to move axially along a nut axis. The nut may be received into a corresponding piston pocket. Preferably, the nut is received in a corresponding piston pocket such that the nut does not rotate therein. During a parking brake apply, the spindle may be rotated in an apply direction, which may cause the corresponding nut to axially move in an apply direction towards the bottom pocket surface of the piston pocket. Once the nut contacts the bottom pocket surface (i.e., once a gap is taken up between the nut and the bottom pocket surface), further rotation of the spindle causes the nut to further move axially thus moving the brake piston and the brake pad towards the brake rotor to create the clamping force. During release of the parking brake, the spindle may be rotated in a release direction, which may cause the corresponding nut to axially move in a release direction away from a bottom pocket surface so that the corresponding brake piston moves away from the brake pad. The brake pad can then move away from the brake rotor to release the clamping force.

The clutch may function to transfer power or torque from the motor gear unit to one or more of the actuator assemblies. The clutch may transfer the torque to the actuator assemblies sequentially, simultaneously, or a combination of both. For example, the clutch may first transfer torque to one or more of the actuator assemblies before transferring torque to one or more other actuator assemblies. This may be preferred so that one end of the brake pad is moved relative to the brake rotor before another end is moved relative to the brake rotor. Thus, for example, a smaller motor gear unit can be used to move a plurality of brake pistons to create and/or release of parking brake apply. Thus, for example, a motor gear unit intended for creating a clamping force in light duty applications can be used to create a clamping force in a heavy duty applications. Additionally or alternatively, the clutch may transfer torque to all of the actuator assemblies at substantially the same time. This may be preferred so that both ends of a brake pad are moved towards and/or away from a brake rotor at substantially the same time. Additionally or alternatively, the clutch may first transfer torque to some actuator assemblies and then to all actuator assemblies simultaneously, or vice versa.

The clutch may include one or more solenoids, one or more couplers, or both. The solenoid may convert energy into linear motion. The solenoid may receive one or more signals from a source. The signal may be received through one or more connectors on the solenoid, the coupler, or both. The signal may communicate to the solenoid to apply the parking brake, release the parking brake, or both. The signal may be automatically generated when a vehicle is put in park. The signal may be generated when a user actuates or depresses or actuated a button, switch or lever. The signal source may be any suitable source, such as a module, a control module, electronic control unit (ECU), a computer, the like, or a combination thereof. The signal may be any suitable signal. For example, the signal may be D.C. current. The signal may be pulsed. The signal may be modulated. The signal may be received by the solenoid, which may then cause the coupler to move. The signal may cause the motor gear unit to generate a torque. The signal may cause the motor gear unit to generate a torque and rotate a motor gear unit output in an apply direction during a parking brake apply, a release direction during release of the parking brake, or both.

The motor gear unit output may be in Communication with the coupler so that rotation of the motor gear unit output in an apply direction causes the coupler to rotate in an apply direction. Rotation of the motor gear unit output in a release direction may cause the coupler to rotate in a release direction. The coupler may be in communication or engage the output of the motor gear unit in any suitable manner. For example, the coupler may engage the output of the motor gear unit with grooves, teeth, pegs, posts, notches, splines, friction, the like, or a combination thereof. Preferably, the coupler and the output of the motor gear unit are engaged via mating notches and/or grooves.

The one or more couplers may be moved after a signal is received by the solenoid, or while the signal is being received by the solenoid. Once moved, a suitable means may be used to hold the coupler in the moved-to position. This means may include a biasing member, a mechanical stop, a locking motor gear unit, a ratchet system, the like, or a combination thereof. In other words, preferably, a continuous signal may not be required to hold the coupler in the position it is moved to.

The one or more couplers may be moved along an output of the motor gear unit. The one or more couplers may be moved to engage a second gear; a third gear; or both the second and third gears. When the coupler is moved and engages the second gear, torque from the motor gear unit may be transferred to the first actuator assembly so that the first actuator assembly moves in a corresponding apply or release direction. When the coupler is moved and engages the third gear, torque from the motor gear unit may be transferred to the second actuator assembly so that the second actuator assembly moves in a corresponding apply or release direction. When the coupler is moved and engages both the second and third gears, torque from the motor gear unit may be transferred to the one or more actuator assemblies so that the first and the second actuator assembly moves in a corresponding apply or release direction.

The coupler may engage both the second and the third gear in any suitable manner. For example, the coupler may engage the second gear, the third gear, or both with grooves, teeth, pegs, posts, notches, splines, friction, the like, or a combination thereof. Preferably, the coupler includes a first end with notches and/or grooves that engage corresponding notches and/or grooves in the third gear. Preferably, the coupler includes an opposing second end with notches and/or grooves that engage corresponding notches and/or grooves in the second gear.

A transfer gear may be located between the second gear and a first gear. When the coupler is engaged with the second gear, the transfer gear may function to transfer torque from the second gear to the first gear so that the first actuator assembly moves. When the coupler is engaged with the second gear and the third gear, the transfer gear may function to transfer torque from the second gear to the first gear so that the first actuator assembly moves.

In a steady state condition, when the solenoid is not receiving any signals and/or when the solenoid is not moving the coupler, a biasing member can urge the coupler towards the second gear, towards the third gear, or to a location in between the second and third gears. The biasing member may be a spring, an elastic material, a metallic material, a memory material, the like, or a combination thereof. Preferably, in a steady state condition, the biasing member urges the coupler towards the second gear so that the coupler engages the second gear.

When the parking brake is first actuated or turned ON, the motor gear unit can generate a suitable torque in an apply direction. The torque from the motor gear unit may be transferred through the output to the second gear and then to the first gear via the transfer gear so that the first actuator assembly can move the first or leading end of the brake pad towards the brake rotor to create a clamping force. Once a suitable torque is measured at the first actuator assembly, a signal can be sent to the solenoid to move the coupler to disengage the second gear and engage the third gear. Alternatively, or in addition, once a suitable torque is measured at the first actuator assembly, the coupler may automatically move to disengage the second gear and engage the third gear so that the torque can be transferred to the second actuator assembly. Thus, the second or trailing end of the brake pad can be moved towards and against the brake rotor to create the clamping force. Once a suitable torque or clamping force is measured at the first actuator assembly, the second actuator assembly, or both, the motor gear unit may cease producing the torque. Alternatively, or in addition, a time parameter can be used. That is, a torque can be applied to the first actuator assembly for a suitable, predetermined amount of time (e.g., 0.3 seconds), and then the coupler can move to disengage the second gear and engage the third gear so that the torque can be transferred to the second actuator assembly for another suitable, predetermined amount of time (e.g. 0.3 seconds). After the suitable, predetermined amount of time has passed and/or once a suitable torque or clamping force is measured at the first actuator assembly, the second actuator assembly, or both, the motor gear unit may cease producing the torque.

A substantially similar sequence may be used to release the parking brake apply. That is, once activated or turned ON, the motor gear unit may generate a suitable torque in the release direction. The torque from the motor gear unit can be transferred through the output to the second gear and then to the first gear via the transfer gear so that the first actuator assembly moves. Thus, the first or leading end of the brake pad can move away from the brake rotor and release clamping force. Once a suitable torque is measured or released at the first actuator assembly, a signal can be sent to the solenoid to move the coupler to engage the third gear. Alternatively, once a suitable torque is measured or released, at the first actuator assembly, the coupler may automatically move to disengage the second gear and engage the third gear so that the second actuator assembly can be moved in a release direction. Thus, the second or trailing end of the brake pad can move away from the brake rotor to release the clamping force.

In another configuration, when the parking brake is first turned ON, the signal may be sent to the solenoid to move the coupler to engage the second gear. The signal may cause the motor gear unit to generate a suitable torque in an apply direction. The torque from the motor gear unit can be transferred through the output to the second gear and then to the first gear via the transfer gear so that the first actuator assembly can move the first or leading end of the brake pad towards the brake rotor to create the clamping force. Once a suitable torque is measured at the first actuator assembly, another signal can then be sent to the solenoid to move the coupler to disengage the second gear and engage the third gear. Alternatively, once a suitable torque is measured at the first actuator assembly, the coupler may automatically move to disengage the second gear and engage the third gear so that the second actuator assembly can move the second or trailing edge of the brake pad towards and against the brake rotor to create the clamping force. Once a suitable torque or clamping, force is measured at the first actuator assembly, the second actuator assembly, or both, the motor gear unit may cease producing the torque.

A substantially similar sequence may be used to release the parking brake apply, flat is, once activated or turned ON, a signal can be sent to the solenoid to move the coupler to engage the second gear. The signal may cause the motor gear unit to generate a suitable torque in a release direction. The torque from the motor gear unit can be transferred through the output to the second gear and then to the first gear via the transfer gear so that the first actuator assembly can move in a release direction. Thus, the first or leading end of the brake pad can move away from the brake rotor and release the clamping force. Another signal can then be sent to the solenoid to move the coupler to engage the third gear. Alternatively, once a suitable torque is measured at the first actuator assembly, the coupler may automatically move to engage the third gear so that the second actuator assembly can move in a release direction. The second or trailing edge of the brake pad can then move away from the brake rotor to release the clamping force. Once a suitable torque or clamping force is measured at the first actuator assembly, the second actuator assembly, or both, the motor gear unit may cease producing the torque. Alternatively, or in addition, a time parameter can be used to release the parking brake apply. That is, a torque can be applied to the first actuator assembly for a predetermined amount of time (e.g., 0.3 seconds), and then the coupler can move to disengage the second gear and engage the third gear so that the torque can be transferred to the second actuator assembly for another predetermined amount of time (e.g., 0.3 seconds). After a predetermined time has passed and/or once a suitable torque or clamping force is measured or released at the first actuator assembly, the second actuator assembly, or both, the motor gear unit may cease producing the torque.

In yet another configuration, when the parking brake is first turned ON, the signal may be sent to the solenoid to move the coupler to engage the third gear. The signal may cause the motor gear unit to begin to generate a suitable torque in an apply direction. The torque from the motor gear unit is transferred through the output to the third gear and then to the second actuator assembly. Thus, the second or trailing end of the brake pad can be moved towards the brake rotor to create a clamping force. Another signal can then be send to the solenoid to move the coupler to engage the second gear. Alternatively, once a suitable torque is measured at the second actuator assembly, the coupler may automatically move to engage the second gear so that the first actuator assembly can move the first or leading end of the brake pad towards and against the brake rotor to create the clamping force. Once a suitable torque or clamping force is measured at the first actuator assembly, the second actuator assembly, or both, the motor gear unit may cease producing the torque.

A substantially similar sequence may be used to release the parking brake apply. That is, once activated or turned ON, the motor gear unit may generate a suitable torque in the release direction. The signal may cause the motor gear unit can begin to generate a suitable torque in a release direction. The torque from the motor gear unit may be transferred through the output to the third gear and then to the second actuator assembly so that the second or trailing, end of the brake pad can move away from the brake rotor to release a clamping force. Another signal can then be send to the solenoid to move the coupler to engage the second gear. Alternatively, once a suitable torque is measured at the second actuator assembly, the coupler may automatically move to engage the second gear so that the first actuator assembly can move in a release direction. Thus, the first or leading end of the brake pad can move away from the brake rotor to release the clamping force. Once a suitable torque or clamping force is measured at the first actuator assembly, the second actuator assembly, or both, the motor gear unit may cease producing the torque.

In still yet another configuration, when the parking brake is first turned ON, the signal may be sent to the solenoid to move the coupler to engage both the second and third gears. The signal may cause the motor gear unit can begin to generate a suitable torque in an apply direction. The torque from the motor gear unit may be transferred through the output to the second gear and then to the first gear via the transfer gear so that the first actuator assembly can move the first or leading end of the brake pad towards the brake rotor and create a clamping force. At the same time, the torque from the motor gear unit can be transferred to the third gear so that the second actuator assembly can move the second or leading end of the brake pad towards the brake rotor the create the clamping force. Once a suitable torque or clamping force is measured at the first actuator assembly, the second actuator assembly, or both, the motor gear unit may cease producing the torque.

A substantially similar sequence may be used to release the parking brake apply. That is, once activated or turned ON, the signal may be sent to the solenoid to move the coupler to engage both the second and third gears. The signal may cause the motor gear unit can begin to generate a suitable torque in a release direction. The torque from the motor gear unit may be transferred through the output to the second gear and then to the first gear via the transfer gear. This may cause the first actuator assembly to move in a release direction so that the first or leading end of the brake pad moves away from the brake rotor to release the clamping force. At the same time, the torque from the motor gear unit can be transferred to the third gear so that the second actuator assembly can move in a release direction so that the second or leading end of the brake pad can move away from the brake rotor the release the clamping force. Once a suitable torque or clamping force is measured at the first actuator assembly, the second actuator assembly, or both, the motor gear unit may cease producing the torque.

The one or more motor gear units may be any device or combination of devices that generates a three or torque. During a parking brake apply, the one or more motor gear units may generate a torque that is sufficient to move the one or more brake pistons, the one or more brake pads, or both relative to the brake rotor to create a clamping force. During release of the parking brake, the one or more motor gear units may generate a torque that is sufficient to move the one or more brake pistons so that the one or more brake pads can move away from the brake rotor to release the clamping force. The torque from the one or more motor gear units may be sufficient to hold the one or more brake pistons against the one or more brake pads once a clamping force has been created. The one or more motor gear units may include a motor. The motor may function to generate torque. The motor may be any suitable motor. For example, the motor may be a DC motor, a series wound motor, a shunt wound motor, a compound wound motor, a separately exited motor, a servomotor, or a permanent magnet motor. The one or more motor gear units may include one or more gears that may function to transfer, increase, and/or decrease an output torque generated by the motor. At least a portion of the motor gear unit may be contained within a housing that may be integrally formed with the brake caliper; removably attached to the brake caliper; permanently attached to the brake caliper; or attached in any suitable way to the vehicle.

One or more of the motor gear units may include an output. The output may function to transfer the generated torque from the motor gear unity to the clutch. The output may be a shaft. Preferably, rotation of the output in an apply direction causes the coupler to rotate in an apply direction, and rotation of the output in a release direction causes the coupler to rotate in a release direction. Preferably, the output is keyed or includes grooves corresponding to keys or grooves in the coupler.

FIG. 1 illustrates a brake system 100 and a parking brake system 102.

FIG. 2 further illustrates the brake system 100 and the parking brake system 102. The brake system 100 includes a brake caliper 104 supporting an inboard brake pad 106 and an outboard brake pad 108. A brake rotor 172 extends between the inboard and outboard brake pads 106, 108. Both of the inboard and outboard brake pads 106, 108 include a friction material 110 and a pressure plate 112. The brake caliper 104 also includes a first piston 114 located near a first end 116 (i.e., the leading end) of the inboard brake pad 106, and a second piston 118 located near a second end 120 (i.e., the trailing end) of the inboard brake pad 106. The first piston 114 includes a first piston pocket 122, and the second piston 118 includes a second piston pocket 124.

The parking brake system 102 includes a first actuator assembly 126 and a second actuator assembly 128. The first actuator assembly 126 includes a first spindle 130 and a first nut 132 received into the first piston pocket 122. The second actuator assembly 128 includes a second spindle 134 and a second nut 136 received into the second piston pocket 124. The first spindle 130 is in communication with a first gear 138. The second spindle 134 is in selective communication with a second gear 140. A transfer gear 144 is located between and in communication with both the first and second gears 138, 140. The second spindle 134 is in communication with a third gear 142, and the third gear 142 is in selective communication with the second gear via a clutch 170. A motor gear unit 166 is in selective communication with the first and second gears 138, 140 via the clutch 170.

Figure 4:
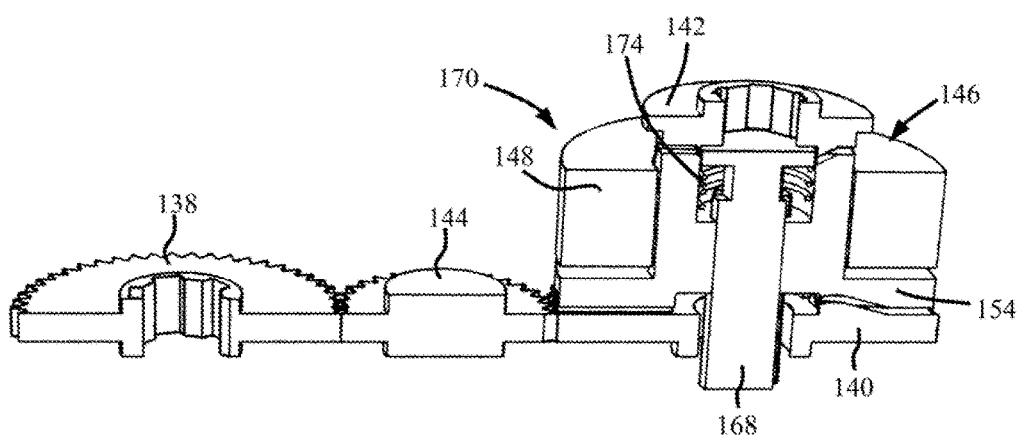
FIG. 4 is a perspective, cross-sectional view of the portion of the parking brake system taken along line 4-4 of FIG. 3.

Referring to FIGS. 3 and 4, the transfer gear 144 is located between the first and second gears 138, 140 so that when the second gear 140 rotates, the first gear 138 also rotates. The clutch 170 includes a coupler 146 and a solenoid 148. The coupler 146 includes a first end 150 having engagement features 152, and a second end 154 having engagement features 156. The solenoid 148 includes connectors 162 for receiving signals from a control module 164 for moving the coupler 146. That is, to create a parking brake apply, to release the parking brake apply, or both, a signal can be provided to the coupler 164 so that the coupler 146 moves along the output 168 of the motor gear unit 166 towards the third gear 142, towards the second gear 140, or to a location therebetween. More specifically, the coupler 146 can be moved towards the third gear 142 so that the engagement features 152 engage the engagement features 160 on the third gear 142. The coupler 146 can be moved towards the second gear 140 so that the engagement features 156 engage the engagement features 158 on the second gear 140. The coupler 146 can be moved to a location between the third gear 142 and the second gear 140 so that the engagement features 152, 156 engage the corresponding engagement features 160, 158.

In a steady state condition, when the solenoid 148 is not receiving any signals and/or when the solenoid 148 is not causing the coupler 146 to move, a biasing member 174 can urge the coupler 146 towards the second gear 140. In other words, in a steady state condition, the engagement features 156 on the second end 154 of the coupler 146 engage the engagement features 158 on the second gear 140, and/or the engagement features 152 on the first end 150 of the coupler 146 engage the engagement features 160 on the third gear 142.

Figure 5A:
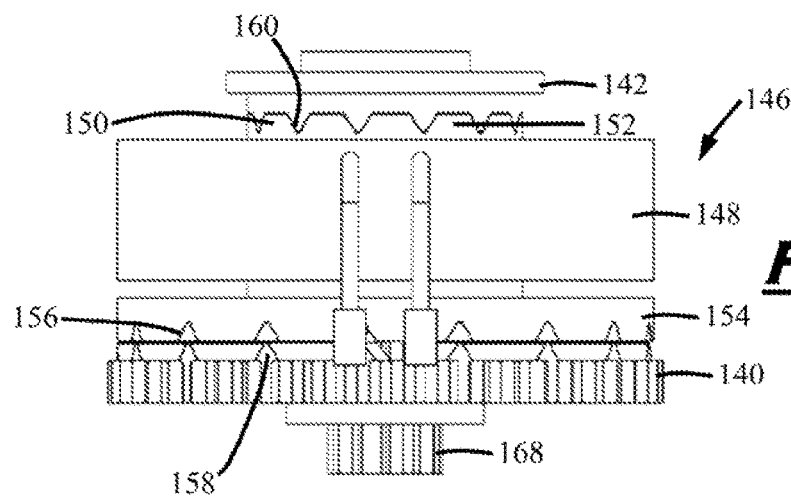
FIG. 5A is a side view of the clutch including the second and third gears of the parking brake system.
Figure 5B:
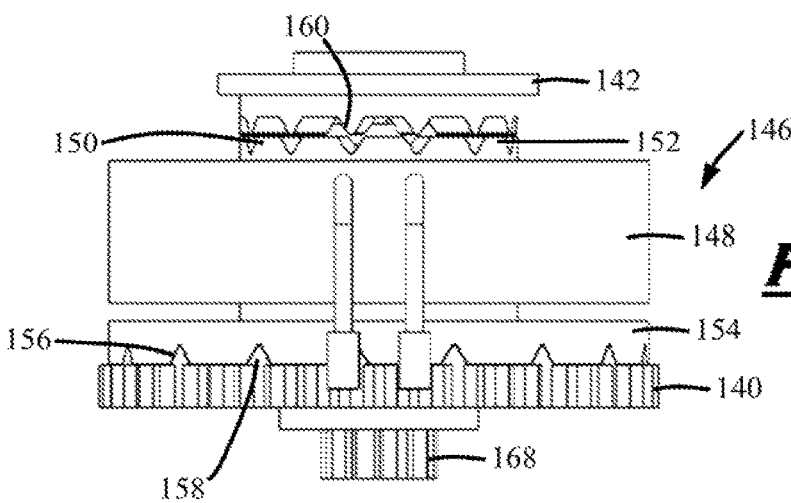
FIG. 5B is a side view of the clutch including the second and third gears of the parking brake system.
Figure 5C:
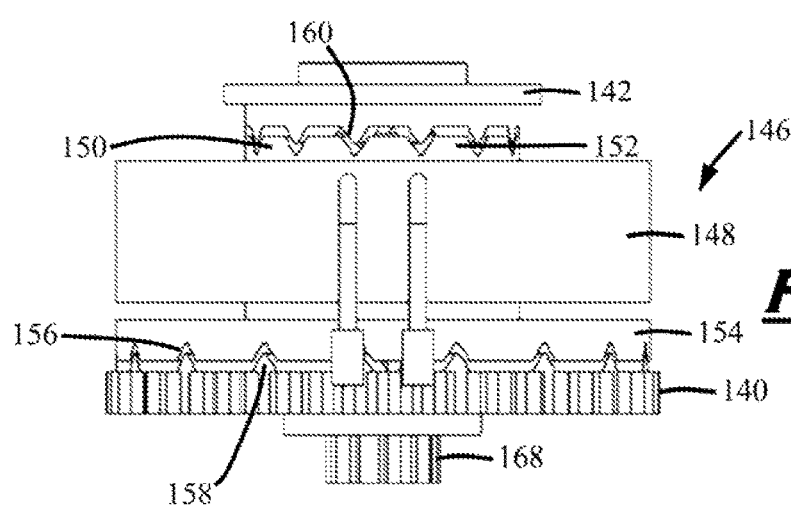
FIG. 5C is a side view of the clutch including the second and third gears of the parking brake system.

FIGS. 5A-5C illustrate movement of coupler 146 to create a parking brake apply, to release the parking brake apply, or both.

Referring to FIG. 5A, by communicating a signal to the solenoid 148, the coupler 146 can be moved along the output 168 of the motor gear unit 166 towards the third gear 142 so that the engagement features 152 at the first end 150 of the coupler 146 engage the engagement features 160 on the third gear 142. The engagement features 156 at the second end 154 of the coupler 146 are disengaged from the engagement features 158 on the second gear 140. Accordingly, as the output 168 of the motor gear unit 166 rotates in either an apply direction or a release direction, the coupler 146 and the third gear 142 rotate thereby causing the second actuator assembly 128 to move. That is, referring, back to FIG. 2, rotation of the third gear 142 in an apply or release direction causes the second spindle 134 to rotate in a corresponding apply or release direction, which causes the second nut 136 to move in a corresponding apply or release direction. When the second nut 136 is moved in the apply direction, the second piston 118 and, therefore, the friction material 110 at the second end 120 of the inboard brake pad 106 is moved against the brake rotor 172 to create the parking brake apply. When the second nut 136 is moved in the release direction, the second piston 118 moves away from the pressure plate 112 of the inboard brake pad 106 so that the friction material 110 at the second end 120 of the inboard brake pad 106 moves away from the brake rotor 172.

Referring to FIG. 5B, by communicating a signal to the solenoid 148, the coupler 146 can be moved along the output 168 of the motor gear unit 166 towards the second gear 140 so that the engagement features 156 at the second end 154 of the coupler 146 engage the engagement features 158 on the second gear 140. The engagement features 152 at the first end 150 of the coupler 146 can disengage the engagement features 160 on the third gear 142. Accordingly, as the output 168 of the motor gear unit 166 rotates in either an apply or release direction, the coupler 146 and the second gear 140 rotate in a corresponding apply or release direction. Referring back to FIG. 2, rotation of the second gear 140 in either an apply or release direction causes the first gear 138 to rotate in the corresponding apply or release direction via the transfer gear 144. Rotation of the first gear 138 causes the first actuator assembly 126 to move. That is, rotation of the first gear 138 in an apply or release direction causes the first spindle 130 to rotate in a corresponding apply or release direction. Rotation of the first spindle 130 in an apply or release direction causes the first nut 132 to move in a corresponding apply direction or a release direction. When the first nut 132 is moved in the apply direction, the first piston 114 and, therefore, the friction material 110 at the first end 116 of the inboard brake pad 106 is moved against the brake rotor 172 to create the parking brake apply. When the first nut 132 is moved in the release direction, the first piston 114 moves away the pressure late 112 of the inboard brake pad 106 so that the friction material 110 at the first end 116 of the inboard brake pad 106 moves away from the brake rotor 172. Because the coupler 146 is disengaged from the third gear 142, rotation of the output 168 of the motor gear unit 166 does not cause the second actuator assembly 128 to move.

Referring to FIG. 5C, by communicating a signal to the solenoid 148, the coupler 146 can be moved along the output 168 of the motor gear unit 166 to a location between the second and third gears 140, 142. In this position, the engagement features 152 at the first end 150 of the coupler 146 engage the engagement features 160 on the third gear 142, and the engagement features 156 at the second end 154 of the coupler 146 engage the engagement features 158 on the second gear 140. Accordingly, as the output 168 of the motor gear unit 166 rotates in either an apply direction or a release direction, the second and third gears 140, 142 rotate, which causes both the first and second actuator assemblies 126, 128 to move. That is, rotation of the second gear 140 in either an apply or release direction causes the first gear 138 to rotate via the transfer gear 144, which causes the first spindle 130 to rotate in a corresponding apply or release direction. Rotation of the first spindle 130 in an apply or release direction causes the first nut 132 to move in a corresponding apply or release direction. Rotation of the third gear 142 in a corresponding apply or release direction causes the second spindle 134 to rotate in a corresponding apply or release direction, which causes the second nut 136 to move in a corresponding apply or release direction. When the nuts 132, 136 are moved in the apply direction, the corresponding pistons 114, 118 and therefore the corresponding ends 116, 120 of the inboard brake pad 106 are moved against the brake rotor 172 to create the paring brake apply. When the nuts 132, 136 are moved in the release direction, the first and second nuts 132, 136 move away from the corresponding pistons 114, 118 and, therefore, the corresponding ends 116, 120 of the inboard brake pad 106 move away from the brake rotor 172 thereby releasing the parking brake apply.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps. By use of the term "may" herein, it is intended that any described attributes that "may" be included are optional.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

We claim:
1. A brake system comprising:
   i. a first actuator assembly,
   ii. a second actuator assembly,
   iii. a motor, and
   iv. a clutch comprising a coupler; and
   v. an inboard brake pad;
   wherein during a first condition, the coupler is moved to a first position so that the clutch communicates power from the motor only to the first actuator assembly so that a first end of the inboard brake pad is moved relative to a brake rotor,
   wherein during a second condition, the coupler is moved to a second position so that the clutch communicates the power from the motor only to the second actuator assembly so that a second end of the inboard brake pad is moved relative to the brake rotor, and
   wherein during a third condition, the coupler is moved to a third position so that the clutch communicates the power from the motor to both the first actuator assembly and the second actuator assembly so that both the first end of the inboard brake pad and the second end of the inboard brake pad is moved relative to the brake rotor.

2. The brake system of claim 1, wherein the brake system includes:
   vi. a first gear in communication with the first actuator assembly;
   vii. a second gear in selective communication with the second actuator assembly; and
   viii. a third gear in communication with the second actuator assembly,
   wherein during the first condition, the coupler engages the second gear so that the power from the motor is communicated to the first gear and then to the first actuator assembly,
   wherein during the second condition, the coupler disengages the second gear and engages the third gear so that the power from the motor is communicated to the second actuator assembly, and
   wherein during the third condition, the coupler engages both the second gear and the third gear so that the power from the motor is communicated to both the first actuator assembly and the second actuator assembly.

3. The brake system of claim 2, wherein a transfer gear is located between the second gear and the first gear so that during the first condition when the coupler engages the second gear, the power from the motor is communicated to the first gear.

4. The brake system of claim 1, wherein the clutch comprises a a solenoid,
   wherein during the first condition, an electrical signal is communicated to the solenoid, which then moves the coupler towards a second gear so that the coupler disengages a third gear and engages the second gear so that the power from the motor is communicated to the first actuator assembly,
   wherein during the second condition, an electrical signal is communicated to the solenoid, which then move the coupler towards the third gear so that the coupler disengages the second gear and engages the third gear so that the power from the motor is communicated to the second actuator assembly, and
   wherein during the third condition, an electrical signal is communicated to the solenoid, which then moves the coupler to a location between the second gear and the third gear so that the couple engages both the second gear and the third gear so that the power from the motor is communicated to both the first actuator assembly and the second actuator assembly.

5. The brake system of claim 4, wherein the clutch includes a biasing member that biases the coupler towards the second gear when the electrical signal is not being communicated to the solenoid.

6. The brake system of claim 1, wherein during a brake apply, the clutch first communicates the power from the motor to the first actuator assembly before communicating the power to the second actuator assembly so that the first end of the inboard brake pad moves towards the brake rotor before the second end of the inboard brake pad moves towards the brake rotor.

7. The brake system of claim 1, wherein during release of a brake apply, the clutch first communicates the power from the motor to the first actuator assembly before communicating the power to the second actuator assembly so that the first end of the inboard brake pad moves away from the brake rotor before the second end of the inboard brake pad moves away from the brake rotor.

8. The brake system of claim 1, wherein the first actuator assembly includes a first spindle and a first nut in communication with a first piston, and the second actuator assembly includes a second spindle and a second nut in communication with a second piston,
wherein:
  i. during the first condition when the power from the motor is communicated to the first actuator assembly, the first spindle rotates which causes the first nut and the first piston to move axially so that the first end of the inboard brake pad is moved relative to the brake rotor,
  ii. during the second condition when the power from the motor is communicated to the second actuator assembly, the second spindle rotates which causes the second nut and the second piston to move axially so that the second end of the inboard brake pad is moved relative to the brake rotor, and
  iii. during the second condition when the power from the motor is communicated to both the first actuator assembly and the second actuator assembly, the first and the second spindles rotate which cause the corresponding first and second nuts and the first and second pistons to move so that the first and second ends of the inboard brake pad are moved relative to the brake rotor.

9. An assembly comprising:
a. a brake caliper including:
  i. a brake pad; and
b. a parking brake system including:
  i. a first actuator assembly in communication with a first end of the brake pad;
  ii. a second actuator assembly in communication with a second end of the brake pad;
  iii. a motor gear unit in communication with the first actuator assembly, the second actuator assembly, or both, and
  iv. an electromechanical clutch comprising a coupler and a solenoid,
wherein electrical power is sent to the solenoid so that the coupler moves in a first direction and engages a second gear so that power from the motor gear unit is communicated only to the first actuator assembly so that the first end of the brake pad is moved relative to a brake rotor, and
wherein electrical power is sent to the solenoid so that the coupler moves in a second direction and engages a third gear so that the power from the motor gear unit is communicated only to the second actuator assembly so that the second end of the brake pad is moved relative to the brake rotor.

10. The assembly of claim 9, wherein electrical power is sent to the solenoid so that the coupler moves to a location between the second gear and the third gear so that the first actuator assembly moves the first end of the brake pad relative to the brake rotor and the second actuator assembly moves the second end of the brake pad relative to the brake rotor at generally the same time.

11. The assembly of claim 9, wherein the electromechanical clutch includes a biasing member that biases the coupler towards the second gear when the electrical power is not being sent to the solenoid.

12. The assembly of claim 9, wherein during a parking brake apply, the electrical power is sent to the solenoid so that the first actuator assembly is moved before the second actuator assembly is moved so that the first end of the brake pad is moved towards the brake rotor before the second end of the brake pad is moved towards the brake rotor,
wherein the first end of the brake pad is a leading end of the brake pad, and the second end of the brake pad is a trailing end of the brake pad.

13. The assembly of claim 9, wherein during release of a parking brake apply, the electrical power is sent to the solenoid so that the first actuator assembly is moved before the second actuator assembly is moved so that the first end of the brake pad is moved away from the brake rotor before the second end of the brake pad is moved away from the brake rotor.

14. The assembly of claim 9, wherein a first gear is in communication with the first actuator assembly,
wherein when the coupler engages the second gear, the power from the motor gear unit is communicated only to the first gear which moves the first actuator assembly so that the first end of the brake pad moves relative to the brake rotor, and
wherein a transfer gear is located between the second gear and the first gear so that the power from the motor gear unit is communicated from the second gear to the first gear.

15. A method comprising:
moving a coupler into a first position so that power from a motor is communicated to a first actuator assembly so that a first end of a brake pad is moved relative to a brake rotor;
moving the coupler into a second position so that the power from the motor is communicated to a second actuator assembly so that a second end of the brake pad is moved relative to the brake rotor; and
moving coupler into a third position so that the power from the motor si communicated to both the first actuator assembly and the second actuator assembly so that both the first end of the brake pad and the second end of the brake pad are moved relative to the brake rotor.

16. The method of claim 15, wherein the step of communicating the power from the motor to the first actuator assembly is before the step of communicating the power from the motor to the second actuator assembly.

17. The method of claim 15, wherein the step of communicating the power to the first actuator assembly comprises engaging the coupler with a second gear that is in communication with a first gear that is in communication with the first actuator assembly.

18. The method of claim 15, wherein the step of communicating the power to the second actuator assembly comprises engaging the coupler with a third gear that is in communication with the second actuator assembly.

19. The method of claim 15, wherein the step of communicating the power to the first actuator assembly comprises sending an electrical signal to a solenoid, which causes the coupler to move and engage a gear that is in communication with the first actuator assembly; and wherein the step of communicating the power to the second actuator assembly comprises sending an electrical signal to the solenoid, which causes the coupler to moves and engage another gear that is in communication with the second actuator assembly.

20. The method of claim 15, wherein the step of communicating the power to the first actuator assembly is done at substantially the same time as the step of communicating the power to the second actuator assembly.

\* \* \* \* \*

UNITED STATES PATENT AND TRADEMARK OFFICE
CERTIFICATE OF CORRECTION

PATENT NO. : 9,752,635 B2  
APPLICATION NO. : 14/833383  
DATED : September 5, 2017  
INVENTOR(S) : Bahmata et al.

Page 1 of 1

It is certified that error appears in the above-identified patent and that said Letters Patent is hereby corrected as shown below:

In the Claims

Column 16, Line 42:
Delete "a" after "comprises"

Column 16, Line 58:
Delete "couple" and insert therein --coupler--

Column 19, Line 4:
Delete "moves" and insert therein --move--

Signed and Sealed this
Twenty-fourth Day of July, 2018

Andrei Iancu
*Director of the United States Patent and Trademark Office*